United States Patent [19]

Hamilton

[11] 4,374,881
[45] Feb. 22, 1983

[54] HEAT RECOVERABLE CONNECTOR

[75] Inventor: Stephen R. Hamilton, Ravenna, Ohio

[73] Assignee: Eaton Corporation, Cleveland, Ohio

[21] Appl. No.: 247,027

[22] Filed: Mar. 24, 1981

[51] Int. Cl.³ .......................... B32B 1/08; H02G 3/04
[52] U.S. Cl. ..................................... 428/36; 138/115;
138/DIG. 5; 156/86; 174/95; 174/97;
174/DIG. 8; 428/188
[58] Field of Search .................... 428/36, 188; 156/86;
174/95, 97, DIG. 8; 138/DIG. 5, 115

[56] References Cited

U.S. PATENT DOCUMENTS

| | | | |
|---|---|---|---|
| 1,776,484 | 9/1930 | Whitehouse | 138/115 |
| 2,740,095 | 3/1956 | Somes | 138/115 |
| 3,243,211 | 3/1966 | Wetmore | 287/78 |
| 3,415,287 | 8/1964 | Heslop et al. | 138/141 |
| 3,708,611 | 1/1973 | Dinger | 174/84 |
| 3,717,717 | 2/1973 | Cunningham et al. | 174/73 |
| 3,957,382 | 5/1976 | Gruel, Jr. et al. | 156/86 |
| 4,179,319 | 12/1979 | Lofdahl | 156/86 |
| 4,283,596 | 8/1981 | Vidakovits et al. | 174/DIG. 8 |

Primary Examiner—Paul J. Thibodeau
Attorney, Agent, or Firm—Charles H. Grace; Albert E. Chrow

[57] ABSTRACT

Disclosed are heat recoverable connectors for use as a protective covering about a plurality of joined articles such as wire splices or tubing junctures. The connectors are open-ended and feature at least one internal wall extending for at least a portion of the distance along the length of the connector to provide a plurality of open-ended channels within the connector for respectively containing one or more of the plurality of joined articles so as to insure their separation during the process of shrinking the connector by heat.

6 Claims, 5 Drawing Figures

U.S. Patent  Feb. 22, 1983  4,374,881
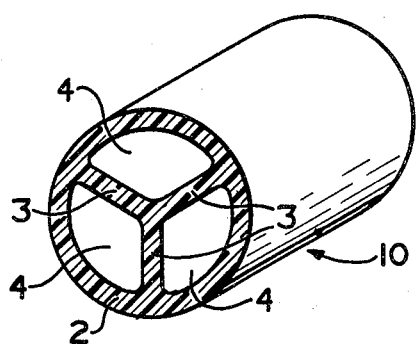
FIG. IA
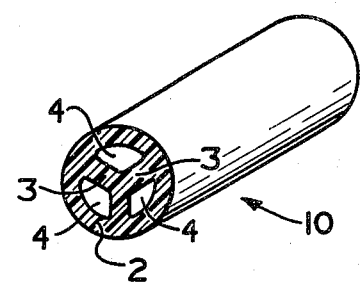
FIG. IB
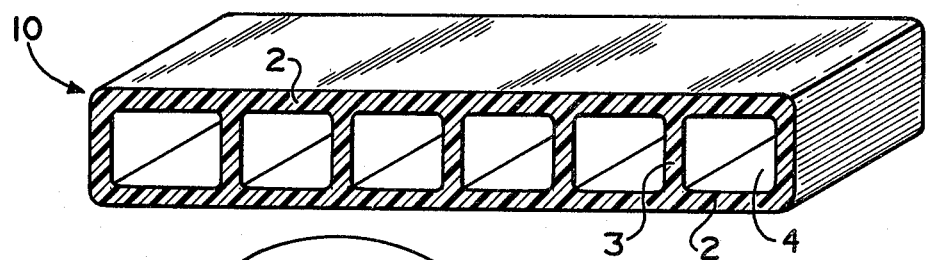
FIG. 2
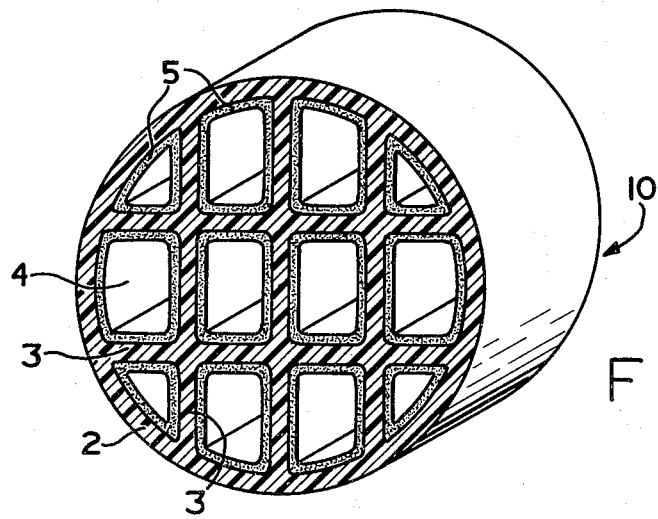
FIG. 3
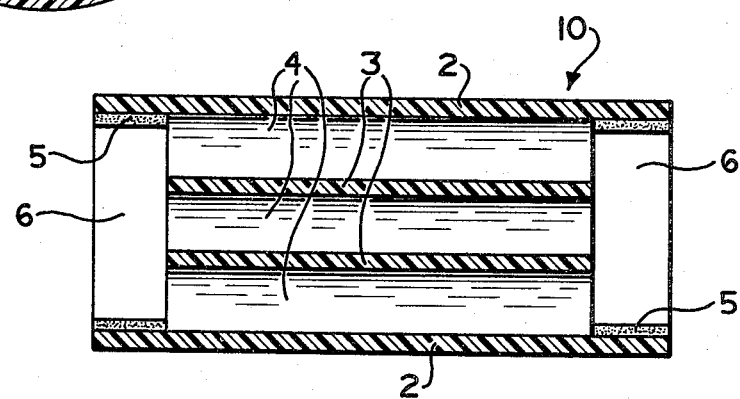
FIG. 4

HEAT RECOVERABLE CONNECTOR

INTRODUCTION

This invention relates generally to a heat recoverable connector for use as a protective covering over joined articles such as electrical wire splices and pipe or tubing junctures and more particularly to an open-ended heat recoverable connector that is adapted to provide an individual protective covering about a plurality of joined articles such as electrical wire splices and pipe or tubing junctures by means of a plurality of adjacent co-extending open-ended internal channels enclosed by internal walls that are integrally related to and contained within the outer wall of the sleeve.

BACKGROUND OF THE INVENTION

This application is similar to but distinguishable from copending Application Ser. No. 207,851 owned by the assignee of this application and filed on Nov. 17, 1980.

Heat recoverable sleeves made from a material having elastic memory have been used for many years to protect, insulate, and sometimes aid in connecting and providing electrical continuity between spliced electrical wire ends and to provide a protective covering about pipe or tubing junctures. Embodiments of such sleeves for use as a protective covering about singular wire splices in conjunction with incorporating a means of aiding electrical continuity are proposed for example in U.S. Pat. Nos. 2,243,211 and 3,708,611 and in U.S. Pat. No. 3,717,717 where a heat shrinkable cable sleeve is proposed that utilizes an outer semi-conductive sleeve in conjunction with an inner conductive sleeve. In U.S. Pat. No. 3,415,287 a heat recoverable jacket containing a mastic is proposed for use in protecting pipe joints.

Although such sleeves have been found to be of advantage by their ability to shrink snugly about wire splices and pipe or tube junctures to provide effective seals against penetration of moisture and other corrosive elements, they have the disadvantages of being limited to singular constructions that are able to accommodate only a single wire splice or pipe or tubing juncture and hence require the costly time consuming task of having to individually shrink each sleeve by heat separately about a single wire splice or pipe or tubing juncture as well as result in undesirable bulkiness associated with groupings of a plurality of such sleeves when adjacently positioned.

In U.S. Pat. No. 3,243,211 it is further proposed to use a fusible insert within a heat shrinkable sleeve that has a plurality of perforations for individually encapsulating a plurality of wire splices. However, since the fusible insert is caused to melt and flow during the process of shrinking the sleeve by heat, there is the possibility that one or more of the wire splices may drift from their original positions within the fusible member during the heating process and thus result in the possibility of inadequate insulation thickness between adjacent wire splices.

In contrast to the use of such individual sleeves are fusible inserts for encapsulating a plurality of spliced wire ends, the open-ended heat recoverable connector of the present invention permits a plurality of articles such as wire ends or pipe or tubing ends to be joined together within the protection of only a single outer surrounding wall as well as be individually separated from each other by at least one internal wall that is integral with the outer wall of the connector and does not melt and flow when the connector is shrunken by heat in addition to being able to be shrunken by only a single application of heat as well as minimizing the bulkiness ordinarily occurring when a plurality of the prior art heat recoverable sleeves are positioned adjacent each other.

SUMMARY OF THE INVENTION

Accordingly, it is an object of this invention to provide an open-ended heat recoverable sleeve made from a material having elastic memory that is adapted to provide an individual and combined protective covering about a plurality of joined articles such as electrical wire splices and pipe or tubing junctions in a single heating operation.

It is a further object of this invention to provide an open-ended heat recoverable sleeve made from a material having elastic memory that is adapted to provide an individual and combined protective covering about a plurality of joined articles such as electrical wire splices and pipe or tubing junctures and minimize bulkiness ordinarily associated with the use of separate sleeves about each individual wire splice and pipe or tubing juncture.

It is yet a further object of this invention to provide an open-ended heat recoverable connector made from a material having elastic memory that is adapted to provide an individual and combined protective covering about a plurality of joined articles such as electrical wire splices and pipe or tubing junctures and to assure adequate spacing therebetween by means of internal walls that are integrally related to the outer wall of the connector and will not melt during the process of shrinking the connector by heat.

BRIEF DESCRIPTION OF THE DRAWINGS

FIG. 1A shows a perspective cross-sectional view of an embodiment of the connector of the invention prior to being shrunken by heat and FIG. 2A shows the embodiment of FIG. 1A after having been shrunken by heat;

FIG. 2 shows a cross-sectional perspective view of an embodiment of the connector of the invention having a substantially rectangular cross-sectional shape;

FIG. 3 shows a cross-sectional perspective view of an embodiment of the connector of the invention having a layer of adhesive adhered to the inner channel walls; and FIG. 4 shows a longitudinal cross-sectional view of an embodiment 10 of the invention having cavities at both of its ends for receiving the end of objects such as electrical cable or tubing bundles.

DETAILED DESCRIPTION OF PREFERRED EMBODIMENTS

FIG. 1A shows an embodiment of open-ended connector 10 of the invention having a substantially tubular shaped outer surrounding wall 2 that is integrally related to internal walls 3. Wall 2 extends along the entire length of connector 10 between one end and an opposite end thereto. Inner walls 3 extend along the length of connector 10 and partition connector 10 within wall 2 into three open-ended channels 4 that extend coextensively along the length of connector 10 from one open end to the opposite open end thereof. Connector 10 of FIG. 1A is shown in a dimensionally unstable expanded condition prior to inserting individual articles such as spliced wire ends or pipe or tubing junctures into each of the channels 4 and shrinking connector 10 thereabout by heat. Internal walls 3 and outer wall 2 are made from a heat recoverable material having elastic memory and crystalline melting temperature, hereinafter more fully described, that is suitable for the application of connector 10 intended. The length of connector 10 is determined in such a manner that any longitudinal shrinkage of connector 10 occurring during the shrinking process does not preclude walls 3 from providing suitable protection about the particular joined article positioned respectively within channels 4. The cross-sectional shape of each channel 4 may be any shape that is adapted to receive the particular joined article to be inserted into and positioned within each channel 4 in the expanded state and for which walls 3 when shrunken by heat are able to contract about snugly to provide an individual and combined protective covering thereabout.

FIG. 1B shows connector 10 of FIG. 1A after having been shrunken by heat without having a joined article inserted individually into each open-ended channel 4 for illustrative purposes. The outside diameter of surrounding wall 2 of connector 10 is substantially smaller after shrinking with the all-over result being a singular connector of reduced diameter that is able to provide a protective covering about three joined articles such as spliced wire ends or pipe or tubing junctures that is considerably less bulky than otherwise would be the case were individual heat recoverable sleeves used to cover each separately. In conjunction with the contraction of outer wall 2, internal walls 3 have likewise contracted with the all-over result being; the reduction of both the outer diameter of wall 2, the contraction of walls 3, the reduction in the cross-sectional size of channels 4, and a thickening of wall 2 and walls 3. Since walls 3 are caused to thicken during the contraction process and are made from a heat recoverable material that does not melt when connector 10 is shrunken by heat, walls 3 in the contracted state are able to maintain the respective positioning of the individual articles contained within channels 4 and prevent any drift that might have occurred had they been only separated by the prior-art fusible members that are caused to melt and flow during the heating process and thereby assure adequate spacing between the articles.

Although FIGS. 1A and 1B show connector 10 having three internal channels 4 having a particular cross-sectional shape, it is to be understood that connector 10 is not limited to having three internal channels 4 but may have at least one internal wall 3 partitioning connector 10 within wall 2 into a plurality of channels 4 that in the expanded state have any cross-sectional shape suitably adapted to receive and position the particular joined articles to be covered and able to contract snugly about each during the process of shrinking connector 10 by heat.

FIG. 2 shows an embodiment of connector 10 having a substantially rectangular cross-sectional shape in an expanded state prior to the shrinking thereof by heat. Connector 10 has a surrounding outer wall 2 that extends for the entire length between one end thereof and an opposite end thereof. Walls 3 are integral with wall 2 and extend along the length of connector 10 between the ends and partition connector within wall 2 into a plurality of internal open-ended channels 4 that extend coextensively from one end to the opposite end of connector 10. Wall 2 and walls 3 are made from a particular heat recoverable material, hereinafter more fully described, selected to meet the requirements of the application for which connector 10 is intended to be used. The length of connector 10 is such that individual joined articles such as spliced wire ends or pipe or tubing junctures can be individually inserted into and positioned within each channel 4 and be suitably covered when connector 10 is shrunken thereabout by heat.

Although it is preferred that the length of inner walls 3 and outer wall 2 be substantially the same for all embodiments of the invention, the length of one or more of inner walls 3 may be less than the length of wall 2 provided that connector 10 is able to previde the protective covering desired about the joined articles contained within channels 4. The embodiment of connector 10 of FIG. 2 is of particular advantage for use in protecting a plurality of flat electrical cable splices and the like and is illustrative of the fact that connector 10 is not limited to having a tubular cross-sectional shape but may have any cross-sectional shape suitable for a particular application.

FIG. 3 shows an embodiment of connector 10 in an expanded state having previously described surrounding outer wall 2 and at least one internal wall 3 that is integrally related to wall 2 and partitions connector 10 within wall 2 into a plurality of open-ended channels that coextensively extend along the length of connector 10 from one open end to the opposite open end. In the embodiment of FIG. 3, the internal surface of wall 2 and the surfaces of walls 3 are coated with a layer 5 of adhesive or fusible material such as disclosed in U.S. Pat. No. 3,243,211, the disclosure of which is incorporated herein by reference, that is able to enhance the sealed engagement between the inner surfaces of walls 3 or walls 3 and wall 2 forming the particular channels 4 and the particular joined article positioned therewithin when connector 10 is shrunken thereabout by heat. The embodiment of connector 10 of FIG. 3 is illustrative of the fact that a layer of suitably selected adhesive or fusible material may be included on the inner surface of the walls of one or more of the channels of any embodiment of connector 10 where such is desired to enhance the sealed engagement between the walls of the channel and the particular joined article positioned therewithin when connector 10 is shrunken thereabout by heat.

FIG. 4 shows a longitudinal cross-sectional view of an embodiment of connector 10 having internal walls 3 that extend for a portion of the distance along the length of connector 10 from one open end to the opposite open end. Connector 10 of FIG. 4 has a surrounding outer wall 2 that extends the entire length thereof and internal walls 3 that are integrally related to wall 2 and are shorter in length than wall 2 by the sum of the longitudinal lengths of cavity 6 disposed at each end of connector 10. Walls 3 partition connector 10 within wall 2 into three open-ended internal channels 4 that communicate between cavities 6. As with all embodiments of connector 10 of the invention, wall 2 and walls 3 are made from a particular heat recoverable material, hereinafter more fully described, that is selected to meet the particular requirements for which connector 10 is intended to be used. Cavities 6 are of advantage in that connector 10 can be used, for example, to provide an individual protective covering about a plurality of joined articles such as spliced wire ends or pipe or tubing junctures extending between the end of objects such as two electrical cables or tubing bundles that are each respectively dimensionally able to be inserted into one of the cavities 6 when connector 10 is in an expanded state prior to shrinking it by heat both about the spliced wire ends and the ends of the two electrical cables or tubing bundles to provide a protective covering therebetween. Cavities 6 have a depth measured longitudinally along the length of connector 10 that is suitable to insure the securement of connector 10 to the ends of the particular objects between which the plurality of articles extending therefrom are joined. A layer 5 of previously described adhesive or fusible material is preferably disposed on the inner surface of wall 2 enclosing each cavity 6 for enhancing the securement of connector 10 to the end of the object positioned therewithin when connector 10 is shrunken thereonto by heat. The embodiment is illustrative of the fact that connector 10 of the invention may have an open-ended cavity disposed at each end for receiving the ends of objects such as electrical cable or tubing or pipe bundle between which connector 10 is to provide an individual covering about each of the joined articles such as spliced wire ends or pipe or tubing junctures extending therebetween. Although it is preferred to dispose a layer 5 of adhesive or fusible material on the inner surface of wall 2 enclosing cavities 6, it may not be necessary in instances where sufficient securement to the ends of the objects can be achieved in its absence. As with all embodiments of connector 10 of the invention, a layer 5 of adhesive or fusible material may be disposed on one or more of the surfaces of walls 3 and/or inner surface of wall 2 forming channels 4 where such is desired to enhance the sealed engagement between the walls enclosing a particular channel and the joined article positioned therewithin.

Heat recoverable materials suitable for use in making the connector of the invention are materials having an elastic memory provided by having sufficient crystallinity such that when expanded from an original dimensionally stable configuration and cooled while in the expanded state, are able to contract to their originally dimensionally stable configuration when subsequently heated to a temperature sufficient to cause the contraction which in most cases has been found to be a temperature that is at or above the crystalline melting point for this particular material.

Selection of a particular heat recoverable material for use in making the connector of the invention is dependent upon the particular properties desired for a particular application such as for example where it is desired to provide an electrically insulative wall 3 between adjacent wire splices or a corrosion resistant wall 3 between adjacent pipe or tubing junctures and the like. Examples of heat recoverable materials that may be used to make the connector of the invention include thermoplastic or elastomeric materials, whether cross-linked or not, such as polyvinyl acetate, polyethylene, polypropylene, polyvinyl chloride, polyamide, polyesters, polyurethanes, halosulfonated polyethylene, halogenated polyethylene, fluorinated polymers, ethylene-propylene-diene rubber, thermoplastic rubber and the like as well as thermosetting materials having the properties desired for a particular application and having sufficient crystallinity to provide the elastic memory previously described.

Heat recoverable materials suitable for use in making the connector of the invention may comprise compatible blends of one or more of the heat recoverable materials previously described and may also include colorants, fillers, plasticizers, flame retardants, chemical cross-linking agents, and irradiation sensitizers for promoting radiation crosslinking such as produced by high energy electrons.

The connector of the invention may be made by molding those thermoplastic or thermoset materials previously described or by extrusion of such materials as are capable of extrusion. Typically, the connector of the invention is molded or extruded such that the channels and cavities, if any, of the connector of the invention are sufficiently smaller in original cross-sectional dimension than the joined articles and objects to be covered such that when the connector will contract snugly thereabout when the connector is shrunken by heat from an expanded state to the contracted state.

What is claimed is:

1. An elongate open-ended connector made from a heat recoverable material having an elastic memory and able to be shrunken by heat from an expanded state to a contracted state to provide an individual protective covering about a plurality of joined articles, said connector in the expanded state comprising, an outer surrounding wall extending along the length of the connector between one end thereof and an opposite end thereof and at least one internal wall extending for at least a portion of the distance along the length of the connector within said outer wall and integrally related therewith that partitions the connector within the outer wall into a plurality of open-ended channels extending between said ends of the connector, said channels having a cross-sectional shape adapted to receive and permit the positioning of the joined articles therewithin, said internal wall having a length thereof sufficient to encapsulate the area of juncture between the respective articles positioned within each of the channels, and said internal wall and said outer wall adapted to contract snugly about the joined articles and thicken without melting to control drift of the joined article towards each other and provide an individual and combined protective covering thereabout of reduced bulk that assures adequate spacing between the joined articles when the connector is contracted by heat.

2. The connector of claim 1 including an open-ended cavity disposed at each of said ends within said outer wall that communicate with said channels and are adapted to respectively receive the end of an object from which the plurality of articles extend and to which the connector contracts snugly about when the connector is contracted by heat.

3. The connector of claims 1 or 2 including a layer of adhesive disposed on the inner surface of the outer wall and on the surfaces of the inner walls enclosing the channels, said adhesive adapted to enhance the sealed engagement between the connector and the articles without degradation when the connector is contracted by heat.

4. The connector of claims 1 or 2 including a layer of fusible material disposed on the inner surface of the outer wall and on the surfaces of the inner walls enclosing the channels, said fusible material adapted to enhance the sealed engagement between the connector and the articles without degradation when the connector is contracted by heat.

5. The connector of claim 2 including a layer of adhesive disposed on the inner surface of the outer wall enclosing said cavities, said adhesive adapted to enhance the sealed engagement between the connector and said objects without degradation when the connector is contracted by heat.

6. The connector of claim 2 including a fusible material disposed on the inner surface of the outer wall enclosing said cavities, said fusible material adapted to enhance the sealed engagement between the connector and said objects without degradation when the connector is contracted by heat.

* * * * *